United States Patent
Dix et al.

(10) Patent No.: US 12,108,696 B2
(45) Date of Patent: Oct. 8, 2024

(54) AGRICULTURAL SYSTEM AND METHOD FOR DETERMINING AN AS-DRIVEN PATH OF AN AGRICULTURAL WORK VEHICLE

(71) Applicant: CNH Industrial America LLC, New Holland, PA (US)

(72) Inventors: Phillip Duane Dix, Westmont, IL (US); Daniel Geiyer, Oshkosh, WI (US); Aditya Singh, Bolingbrook, IL (US); Navneet Gulati, Naperville, IL (US)

(*) Notice: Subject to any disclaimer, the term of this patent is extended or adjusted under 35 U.S.C. 154(b) by 66 days.

(21) Appl. No.: 17/560,887

(22) Filed: Dec. 23, 2021

(65) Prior Publication Data
US 2023/0200281 A1 Jun. 29, 2023

(51) Int. Cl.
*A01B 69/04* (2006.01)
*B60K 35/00* (2006.01)
*B62D 15/02* (2006.01)
*G01C 21/16* (2006.01)
*B60K 35/28* (2024.01)

(52) U.S. Cl.
CPC ............ *A01B 69/008* (2013.01); *B60K 35/00* (2013.01); *B62D 15/021* (2013.01); *B62D 15/025* (2013.01); *G01C 21/16* (2013.01); *B60K 35/28* (2024.01); *B60K 2360/166* (2024.01)

(58) Field of Classification Search
CPC ...... A01B 69/00; A01B 69/001; B62D 15/00; B62D 15/02; G01C 21/00; G01C 21/16
See application file for complete search history.

(56) References Cited

U.S. PATENT DOCUMENTS

| | | | |
|---|---|---|---|
| 6,445,983 B1 | 9/2002 | Dickson et al. |
| 6,789,014 B1 | 9/2004 | Rekow et al. |
| 6,826,478 B2 | 11/2004 | Riewe et al. |
| 7,162,348 B2 | 1/2007 | McClure et al. |

(Continued)

FOREIGN PATENT DOCUMENTS

WO 2017/159801 11/2017

OTHER PUBLICATIONS

Rahman et al., "Heading Estimation of Robot Combine Harvesters During Turning Maneuveres," Sensors, May 1, 2018 (12 pages) doi: 10.3390/s18051390.

(Continued)

*Primary Examiner* — John Kwon
(74) *Attorney, Agent, or Firm* — Rickard K. DeMille; Rebecca L. Henkel; Peter K. Zacharias (57) ABSTRACT

A method for determining an as-driven path of an agricultural work vehicle includes receiving position data indicative of a position of the agricultural work vehicle in a field during a first pass of the agricultural work vehicle in the field, receiving inertial movement data of the agricultural work vehicle during the first pass, and receiving operational data indicative of at least one of a steering angle of a wheel of the agricultural work vehicle, a wheel speed of the wheel of the agricultural work vehicle, or a transmission speed of the agricultural work vehicle during the first pass. Moreover, the method includes generating an as-driven path of the agricultural work vehicle during the first pass based at least in part on the position data, the inertial movement data, and the operational data. Additionally, the method includes performing a control action based on the as-driven path.

17 Claims, 4 Drawing Sheets

(56) References Cited

U.S. PATENT DOCUMENTS

| | | | |
|---|---|---|---|
| 7,274,504 B2 | 9/2007 | Crane et al. | |
| 7,844,378 B2 | 11/2010 | Lange | |
| 8,180,514 B2 | 5/2012 | Kaprielian et al. | |
| 8,855,848 B2 | 10/2014 | Zeng | |
| 9,002,566 B2* | 4/2015 | McClure | G05D 1/0278 |
| | | | 701/28 |
| 9,989,964 B2 | 6/2018 | Berntorp et al. | |
| 10,181,084 B2 | 1/2019 | Ferguson et al. | |
| 10,281,279 B2 | 5/2019 | Ahmed et al. | |
| 2004/0158355 A1* | 8/2004 | Holmqvist | E02F 9/262 |
| | | | 701/23 |
| 2008/0059015 A1 | 3/2008 | Whittaker et al. | |
| 2008/0071476 A1 | 3/2008 | Hoshizaki | |
| 2018/0080193 A1* | 3/2018 | Myers | E02F 9/262 |
| 2019/0111921 A1* | 4/2019 | Hehn | G01C 21/30 |
| 2019/0133023 A1 | 5/2019 | Iwami et al. | |
| 2021/0114659 A1 | 4/2021 | Miyashita et al. | |
| 2021/0289766 A1* | 9/2021 | Long | B60G 99/002 |
| 2022/0363280 A1* | 11/2022 | Calderon | B62D 15/025 |

OTHER PUBLICATIONS

Reid, "Precision Guidance of Agricultural Vehicles," UILU-ENG-98-7031 (10 pages).

European Search Report and Written Opinion dated May 23, 2023 for related European U.S. Appl. No. 22213231 (6 pages).

* cited by examiner

AGRICULTURAL SYSTEM AND METHOD FOR DETERMINING AN AS-DRIVEN PATH OF AN AGRICULTURAL WORK VEHICLE

FIELD OF THE INVENTION

The present disclosure relates generally to agricultural work vehicles and, more particularly, to agricultural systems and methods for determining an as-driven path of an agricultural work vehicle during a first pass in a field.

BACKGROUND OF THE INVENTION

The operation of agricultural vehicles is becoming increasingly automated. For example, harvesters, planters, tillers and the like are often now configured to operate autonomously or semi-autonomously for various applications. Autonomous vehicles may be configured to follow a lead vehicle which may be driven by a human operator. For instance, the lead vehicle may be driven in a first pass across field while the movements of the lead vehicle may be recorded as an as-driven path and used to control an autonomous or follower vehicle making a subsequent pass across the field. However, often times position data, such as data generated by a global positioning system (GPS), is only taken incrementally such that interpolation is needed to determine the as-driven path between the points of the position data. When the position data points are further apart, the as-driven path is less accurate. In some cases, the interpolated as-driven path may even be undrivable. Increasing the frequency of the position data collection increases the accuracy of the as-driven path, but significantly increases the storage requirements and time to generate the as-driven path.

Accordingly, an improved agricultural system and method for determining an as-driven path of an agricultural work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for determining an as-driven path of an agricultural work vehicle. The method may include receiving, with a computing system, position data generated by a position sensor indicative of a position of the agricultural work vehicle in a field during a first pass of the agricultural work vehicle in the field. Similarly, the method may include receiving, with the computing system, inertial movement data generated by an inertial measurement unit (IMU) supported on the agricultural work vehicle during the first pass. Further, the method may include receiving, with the computing system, operational data indicative of at least one of a steering angle of a wheel of the agricultural work vehicle, a wheel speed of the wheel of the agricultural work vehicle, or a transmission speed of the agricultural work vehicle during the first pass. Moreover, the method may include generating, with the computing system, an as-driven path of the agricultural work vehicle during the first pass based at least in part on the position data, the inertial movement data, and the operational data. Additionally, the method may include performing, with the computing system, a control action based at least in part on the as-driven path of the agricultural work vehicle.

In another aspect, the present subject matter is directed to a system for determining an as-driven path of an agricultural work vehicle. The system may include a positioning device configured to generate position data indicative of a position of the agricultural work vehicle in a field. The system may further include an inertial measurement unit (IMU) supported on the agricultural work vehicle, with the MU being configured to generate inertial movement data of the agricultural work vehicle. Moreover, the system may include a non-positional sensor configured to generate operational data indicative of at least one of a steering angle of a wheel of the agricultural work vehicle, a wheel speed of the wheel of the agricultural work vehicle, or a transmission speed of the agricultural work vehicle. Additionally, the system may include a computing system communicatively coupled to the positioning device, the IMU, and the non-positional sensor. The computing system may be configured to receive the position data from the position sensor indicative of the position of the agricultural work vehicle in the field during a first pass of the agricultural work vehicle in the field, receive the inertial movement data from the IMU during the first pass, and receive the operational data from the non-positional sensor during the first pass. The computing system may also be configured to generate an as-driven path of the agricultural work vehicle during the first pass based at least in part on the position data, the inertial movement data, and the operational data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining an as-driven path of an agricultural work vehicle during a first pass across a field. Specifically, in several embodiments, the system includes a position sensor configured to generate position data indicative of the position of the agricultural work vehicle and an inertial measurement unit configured to generate inertial movement data of the agricultural work vehicle. Additionally, the system includes one or more non-positional sensors configured to generate operational data indicative of at least one of a steering angle of a wheel of the agricultural work vehicle, a wheel speed of the wheel of the agricultural work vehicle, or a transmission speed of the agricultural work vehicle. A computing system is configured to receive the position data, the inertial movement data, and the operational data corresponding to the first pass of the agricultural implement across the field and then generate the as-driven path of the agricultural work vehicle for the first pass based at least in part on the position data, the inertial movement data, and the operational data. By using the inertial movement data and operational data in addition to the position data, the as-driven path of the agricultural work vehicle generated is more accurate than when just position-based data is used and is able to better indicate the intention of the operator during the first pass, without requiring a significant increase in data collection. For instance, if the agricultural work vehicle experiences slip as it turns from a first swath to a second swath during the first pass, the slip can be seen in a comparison of the inertial movement data and the operational data and be used to inform subsequent passes (e.g., by the same agricultural work vehicle or a subsequent agricultural work vehicle) in the field based on the as-driven path.

Figure 1:
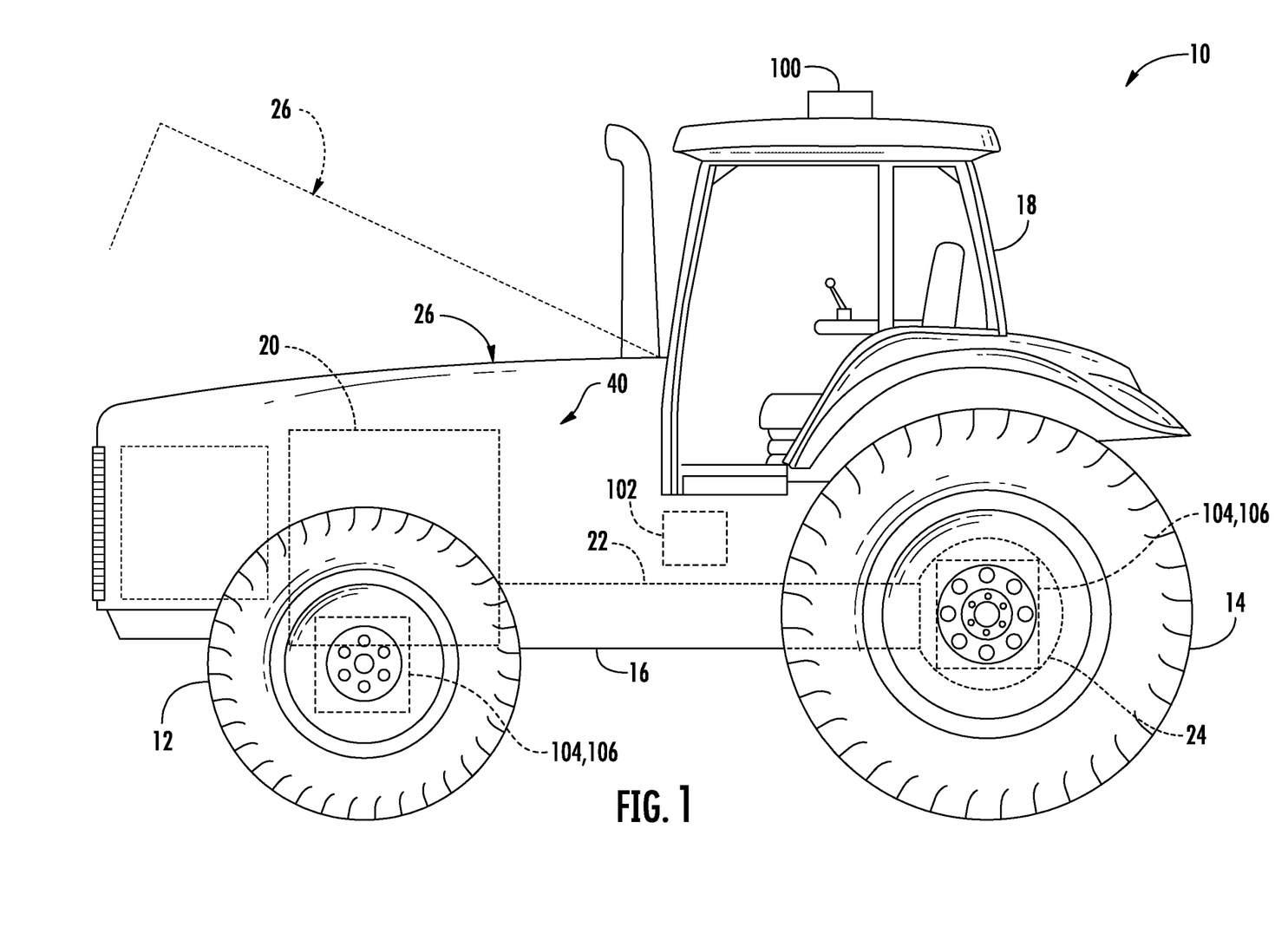
FIG. 1 illustrates a side view of one embodiment of a work vehicle in accordance with aspects of the present subject matter.

Referring now to the drawings, FIG. 1 illustrates one embodiment of a work vehicle 10 in accordance with aspects of the present subject matter. In particular, FIG. 1 illustrates a side view of the work vehicle 10. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown in FIG. 1, the work vehicle 10 includes a pair of front wheels 12, a pair of rear wheels 14, and a chassis 16 coupled to and supported by the wheels 12, 14. An operator's cab 18 may be supported by a portion of the chassis 16 and may house various control devices (not shown) for permitting an operator to control the operation of the work vehicle 10, Additionally, the work vehicle 10 may include an engine 20 and a transmission 22 mounted on the chassis 16. The transmission 22 may be operably coupled to the engine 20 and may provide variably adjusted gear ratios for transferring engine power to the wheels 12, 14 via a differential 24.

The work vehicle 10 may also include a hood 26 configured to least partially surround and/or cover the various under-hood components stored within the vehicle's engine compartment 40, such as the engine 20 and any other suitable under-hood components (e.g., hydraulic components, pneumatic components, electrical components, mechanical component(s), storage tank(s), etc.). As particularly shown in FIG. 1, the hood 26 may be configured to be pivotally coupled to a portion of the work vehicle 10 at or adjacent to its aft end 30 such that the hood 26 can be pivoted about the aft end 30 between a closed position (shown in solid lines in FIG. 1) and an opened position (shown in dashed lines in FIG. 1).

Additionally, in accordance with aspects of the present subject matter, the work vehicle 10 may include one or more positioning sensors 100, one or more inertial measurement units (IMU) 102, and one or more non-positional sensors, such as a wheel angle sensor 104, a wheel speed sensor 106, a transmission speed sensor 108, and/or the like. The positioning sensor(s) 100 may be configured as a GPS system, a Galileo positioning system, the Global Navigation satellite system (GLONASS), the BeiDou Satellite Navigation and Positioning system, and/or the like. Similarly, the IMU(s) 102 may be configured as a combination of accelerometers, gyroscopes, and magnetometers fir generating inertial measurement data indicative of at least acceleration (linear and rotational) and position information in each of three principle axes (x-axis, y-axis, z-axis) of a global reference frame for the respective component of the work vehicle 10.

As indicated above, the work vehicle 10 may be guided to make a first pass over a field to establish an as-driven path that is used to guide the work vehicle 10 or another work vehicle in subsequent passes over the field. For instance, the work vehicle 10 may be manually guided by an operator across the first pass to generate the as-driven path, and subsequent passes may be autonomously performed with the work vehicle 10 or another vehicle based at least in part on the as-driven path. As will be described in greater detail below, the positioning sensor(s) 100, IMU(s) 102, and non-positional sensor(s) 104, 106, 108 may be used to determine the as-driven path of the work vehicle 10 more accurately as it is guided in a first pass over a field.

Figure 2:
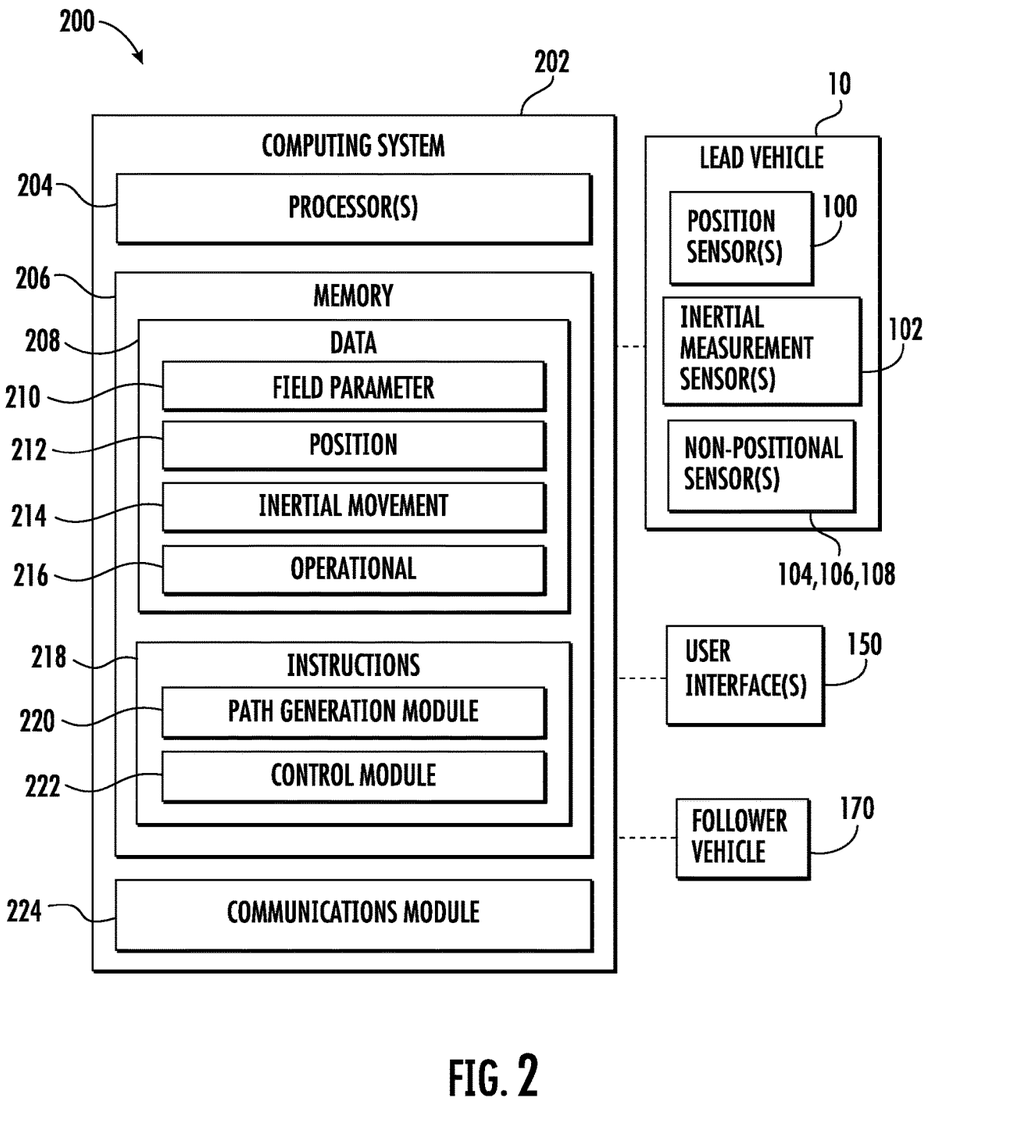
FIG. 2 illustrates a schematic view of a system for determining an as-driven path of an agricultural work vehicle in accordance with aspects of the present subject matter.

Referring now to FIG. 2, a schematic view of one embodiment of a control system 200 for determining an as-driven path of an agricultural work vehicle is illustrated in accordance with aspects of the present subject matter. In general, the control system 200 will be described herein with reference to the work vehicle 10 described with reference to FIG. 1. However, it should be appreciated that the disclosed control system 200 may be used with any suitable work vehicle having any other suitable configuration.

As shown in FIG. 2, the system 200 may include a computing system 202 and various other components configured to be communicatively coupled to and/or controlled by the computing system 202, such as any combination of components of the work vehicle 10 described above with reference to FIG. 1 (e.g., the position sensor(s) 100, the IMU(s) 102, and the non-positional sensor(s) 104, 106, 108), one or more user interfaces 150, a follower vehicle 170, and/or the like. The user interface(s) 150 described herein may include, without limitation, any combination of input and/or output devices that allow an operator to provide operator inputs to the computing system 202 and/or that allow the computing system 202 to provide feedback to the operator, such as a keyboard, keypad, pointing device, buttons, knobs, touch sensitive screen, mobile device, audio input device, audio output device, and/or the like.

In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), and; or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the work vehicle 10, including data 208 associated with determining an as-driven path of the work vehicle 10. For instance, as shown in FIG. 2, the memory 206 may include a field parameter database 210 for storing data associated with a field. Specifically, the field parameter database 210 may include a 2D and/or 3D map of the field, and may include boundaries which should not be interfered or crossed by the work vehicle 10. In some embodiments the map(s)/boundaries may be predetermined and uploaded to the memory 206 and/or may be at least partially generated in real-time based on sensor data from one or more environmental sensors on the work vehicle 10.

The memory 206 may further include a position database 212 for storing data associated with a position of the work vehicle 10 within the field. For instance, the position database 212 may include position data from the position sensor(s) 100 indicative of the position of the work vehicle 10 within the field at different instances during the first pass of the work vehicle 10 across the field. For example, the position data may include the position of the work vehicle 10 within the field taken at a regular time interval (e.g., every 5 seconds, 10 second, 15 seconds, and/or the like) or distance-driven interval (e.g., every 10 feet, 15 feet, 20 feet driven and/or the like).

Moreover, the memory 206 may include an inertial movement database 214 for storing data associated with the inertial movement of the work vehicle 10 within the field. For instance, the inertial movement database 214 may include inertial movement data from the IMU(s) 102 associated with the work vehicle 10 making the first pass across the field. In one embodiment, the inertial movement data is taken more continuously than the position data. However, in other embodiments, the inertial movement data is taken with the same frequency as the position data.

Additionally, the memory 206 may include an operational database 216 for storing data associated with non-position based operating conditions of the work vehicle 10 while the work vehicle 10 moves in the field. For instance, the operational database 216 may include operational data from the non-positional sensor(s) 104, 106, 108. More particularly, the operational database 216 may include a steering angle of the wheel(s) 12, 14 of the work vehicle 10 from the wheel angle sensor(s) 104, a rotational wheel speed of the wheel(s) 12, 14 or axle of the work vehicle 10 from the wheel speed sensor 106, a transmission speed of the transmission 22 from the transmission speed sensor 108, and/or the like. Similar to the inertial movement data 214, the operational data may be taken more continuously than or with the same frequency as than the position data.

Referring still to FIG. 2, the memory 206 of the computing system 202 may store instructions 218 that, when executed by the processor(s) 204, configure the computing system 202 to execute a path generation module 220 for generating an as-driven path of the work vehicle 10. Specifically, the path generation module 220 may be configured to generate the as-driven steering path of the work vehicle 10 from a first pass of the work vehicle 10 across a field based at least in part on the position data 212, the inertial movement data 214, and the operational data 216. In some instances, the path generation module 220 may be configured to generate the as-driven path of the work vehicle 10 from a first pass of the work vehicle 10 across a field additionally based at least in part on the field parameter data 212.

Figure 3A:
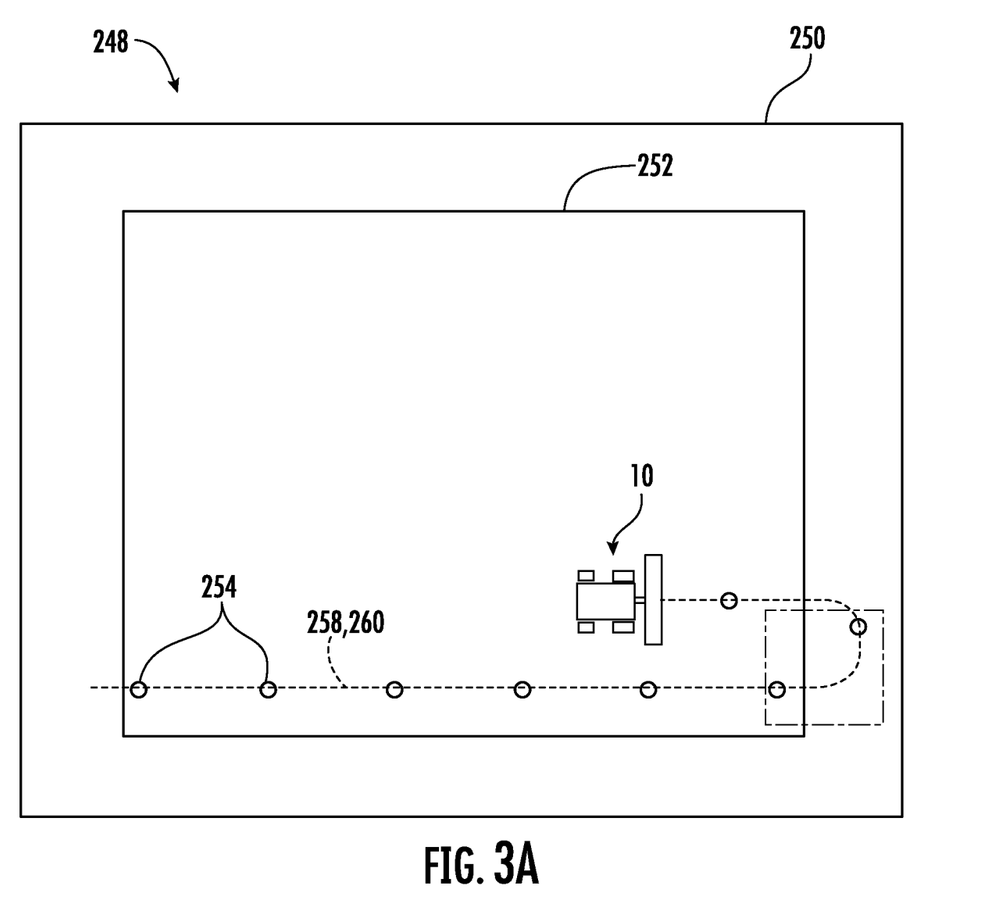
FIGS. 3A and 3B illustrate an example embodiment of an as-driven path of an agricultural work vehicle generated in accordance with aspects of the present subject matter.
Figure 3B:
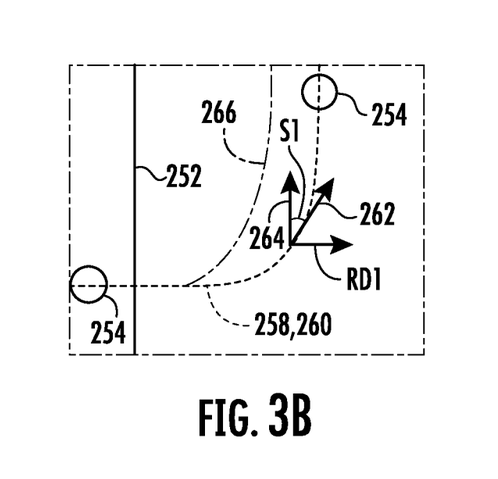

For instance, referring to FIGS. 3A-3B, various views of an example embodiment of an as-driven path of an agricultural work vehicle generated in accordance with aspects of the present subject matter are illustrated. As shown in FIG. 3A, a field 248 includes an outer boundary 250 and a headland boundary 252. The work vehicle 10 may be configured to work, or tow an implement configured to work, the field 248 within the headland boundary 252 and to generally use the headland area between the outer boundary 250 and headland boundary 252 to turn. During a first pass of the work vehicle 10 in the field 248, an operator may guide the work vehicle 10 across a series of swaths while the position sensor(s) 100, IMU(s) 102, and non-positional sensor(s) 104, 106, 108 collect data. For instance, the position sensor(s) 100 may periodically monitor the position of the work vehicle 10 within the field 248 such that the position data generated by the position sensor(s) 100 may include a plurality of positions or position data points 254 that indicate the position of the work vehicle 10 in the field 248 over time, with the position data points 254 being spaced apart by increments of a particular interval (e.g., time elapsed or distance driven) during the first pass.

In accordance with aspects of the present subject matter, the computing system 202 is configured to generate an as-driven path 260 as shown in FIGS. 3A and 3B based at least in part on the inertial movement data 214 and the operational data 216 in addition to the position data 212. More particularly, the computing system 202 may compare the inertial movement data 214 and the operational data 216 to determine a slip of the work vehicle 10 which may be used to inform the intent of the operator during the first pass when generating the as-driven path 260.

For instance, when the operational data 216 includes the steering angle of the wheel(s) 12, 14, the steering angle of the wheel(s) 12, 14 may be compared to the effective steering angle (e.g., yaw) determined from the inertial movement data 214, where the difference between the steering angles from the operational data 216 and from the inertial movement data 214 is indicative of the slip of the work vehicle 10 at a given position in the field 248. When the operational data 216 includes the wheel speed of the wheel(s) 12, 14, the estimated speed of the work vehicle 10 determined based at least in part on the wheel speed of the wheels) 12, 14 may be compared to the effective speed of the work vehicle 10 determined from the inertial movement data 214, where the difference between the speeds of the work vehicle 10 determined from the operational data 216 and the inertial movement data 214 is indicative of the slip of the work vehicle 10 at a given position in the field 248. Similarly, when the operational data includes a transmission speed of the transmission 22 of the work vehicle 10, the estimated speed of the work vehicle 10 determined based at least in part on the transmission speed may be compared to the effective speed of the work vehicle 10 determined from the inertial movement data 214, where the difference in the speeds of the work vehicle determined from the operational data 216 and the inertial movement data 214 is indicative of the slip of the work vehicle 10 at a given position in the field 248.

For example, as shown in FIG. 3B, at one time instance, the effective steering angle 262 determined from the inertial movement data 214 is shown relative to the steering angle 264 determined from the operational data 216, where the steering angles 262, 264 are each taken relative to a reference direction RD1. The difference between the steering angles 262, 264 is equal to the slip angle S1 of the work vehicle 10 at the associated location in the field. The slip, such as the angular slip S1 and/or a vehicle speed slip, helps the computing system 202 improve a path generation algorithm used to "fill-in" or determine the as-driven path between the position data points 254. The path generation algorithm may generally connect directly adjacent ones of the positions 254 of the work vehicle 10 in the field map 248 based at least in part on the inertial movement data 214 and the operational data 216 to generate the as-driven path 260. For instance, the path generation algorithm may use the inertial movement data 214 to generally decide the shape of the as-driven path between the position data points 254 but using the calculated slip to determine the actual positioning of the as-driven path 260 relative to the position data points 254. As such, the generated as-driven path 260 may more accurately follow the actual as-driven path 258.

It should be appreciated that the path generation algorithm may use any suitable state estimation methodology including, but not limited to fuzzy logic, neural networks, and Bayesian estimation (including Kalman filtering and particle filtering). Further, it should be appreciated that the path generation module 220 may be configured to determine the as-driven path 260 in real time (e.g., while the first pass is being performed), using a fixed lag, a variable or adaptive lag, a fixed interval, or a variable or adaptive interval methodology, it should additionally be appreciated that by using the combination of data types (e.g., the combination of the position data 212, the inertial movement data 214, and the operational data 216), the data collected is compact, especially as the operational data may already be collected for other functions of the work vehicle 10, and does not require interpolation to determine the as-driven path 260.

Referring back to FIG. 2, the memory 206 of the computing system 202 may also store instructions 218 that, when executed by the processor(s) 204, configure the computing system 202 to execute a control module 222 wherein the computing system 202 performs a control action. For instance, the control action may include controlling an operation of the user interface(s) 150 to display or otherwise indicate the determined as-driven path 260 of the work vehicle 10 to an operator. Additionally, or alternatively, the control action may include transmitting the as-driven path 260 of the work vehicle 10 and the corresponding slip experienced by the work vehicle 10 to the follower vehicle 170 to guide the follower vehicle in a subsequent pass across the field 248. In some instances, the control action may further comprise controlling the operation of the follower vehicle 170 to make the subsequent pass across the field according to the as-driven path 260. For instance, the follower vehicle 170 may be configured to make a subsequent pass in the field that generally follows the as-driven path 260 of the work vehicle 10. However, if the operating parameters of the follower vehicle are different from the work vehicle 10, an offset control path 266 (FIG. 3B) may need to be generated to account for expected slip with the different operating parameters. For example, if the follower vehicle is traveling at a faster speed during the subsequent pass than the work vehicle 10 during the first pass, the computing system 202 may generate the offset control path 266 for controlling the steering of the follower vehicle 170 to account for the slip at the higher speed such that the follower vehicle 170 actually follows the as-driven path 260 of the work vehicle 10. Other operating parameters of the follower vehicle 170 may alternatively, or additionally, be accounted for, such as the weight of the follower vehicle 170, wheel size, and/or the like.

Additionally, as shown in FIG. 2, the computing system 202 may also include one or more communications interfaces 224 to provide a means for the computing system 202 to communicate with any of the various other system components described herein. For instance, one or more communicative links or interfaces (e.g., one or more data buses) may be provided between the communications interface(s) 224 and the sensor(s) 100, 102, 104, 106, 108 to allow data transmitted from the sensor(s) 100, 102, 104, 106, 108 to be received by the communications interface(s) 224. Similarly, one or more communicative links or interfaces (e.g., one or more data buses) may be provided between the communications interface(s) 224 and the user interface(s) 150 to allow operator inputs to be received by the computing system 202 and to allow the computing system 202 to control the operation of one or more components of the user interface(s) 150, for example, to display the as-driven path 260 to an operator of the vehicle(s) 10, 170. Additionally, one or more communicative links or interfaces (e.g., one or more data buses) may be provided between the communications interface(s) 224 and the follower vehicle 170 to allow data to be transmitted to the follower vehicle 170 from the communications interface(s) 224 and vice versa.

Figure 4:
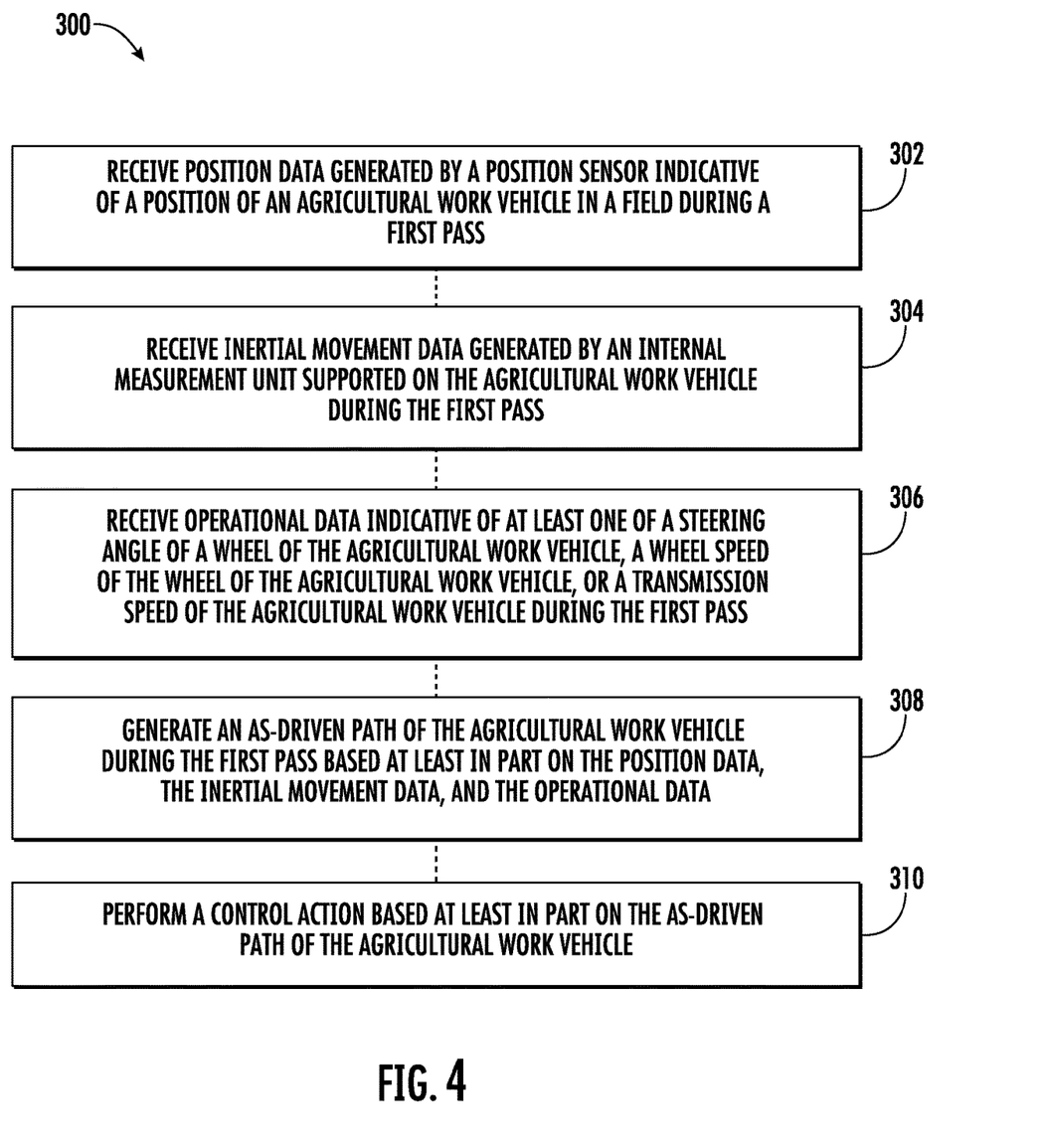
FIG. 4 illustrates a flow diagram of one embodiment of a method for determining an as-driven path of an agricultural work vehicle in accordance with aspects of the present subject matter.

Referring now to FIG. 4, a flow diagram of one embodiment of a method 300 for determining an as-driven path of an agricultural work vehicle is illustrated in accordance with aspects of the present subject matter. In general, the method 300 will be described herein with reference to the work vehicle 10 described above with reference to FIG. 1 and the system 200 described above with reference to FIGS. 2-3B. However, it should be appreciated that the disclosed method 300 may be implemented with work vehicles having any other suitable configuration and/or with systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include receiving position data generated by a position sensor and indicative of a position of the agricultural work vehicle in a field during a first pass. For instance, as described above, the computing system 202 may receive position data generated by the position sensor 100 and indicative of the position of the work vehicle 10 in the field during a first pass of the work vehicle 10 in the field.

At (304), the method 300 may include receiving inertial movement data generated by an inertial measurement unit (IMU) supported on the agricultural work vehicle during the first pass. Similarly, as discussed above, the computing system 202 may receive inertial movement data generated by the IMU(s) 102 supported on the work vehicle 10 during the first pass.

Further, at (306), the method 300 may include receiving operational data indicative of at least one of a steering angle of a wheel of the agricultural work vehicle, a wheel speed of the wheel of the agricultural work vehicle, or a transmission speed of the agricultural work vehicle during the first pass. For instance, as described above, the computing system 202 may receive operational data from the non-positional sensor(s) 104, 106, 108 indicative of at least one of a steering angle of a wheel 12, 14 of the work vehicle 10, a wheel speed of the wheel 12, 14 of the work vehicle 10, or a transmission speed of the work vehicle 10 during the first pass.

Moreover, at (308), the method 300 may include generating an as driven path of the agricultural work vehicle during the first pass based at least in part on the position data, the inertial movement data, and the operational data. For example, the computing system 202 may generate an as-driven path of the work vehicle 10 during the first pass based at least in part on the position data 212, the inertial movement data 214, and the operational data 216.

Additionally, at (310), the method 300 may include performing a control action based at least in part on the as-driven path of the agricultural work vehicle. For instance, as described above, the computing system 202 may perform a control action based at least in part on the as-driven path of the work vehicle 10.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining an as-driven path of an agricultural work vehicle, the method comprising:
   receiving, with a computing system, position data generated by a position sensor indicative of a position of the agricultural work vehicle in a field during a first pass of the agricultural work vehicle in the field;
   receiving, with the computing system, inertial movement data generated by an inertial measurement unit (IMU) supported on the agricultural work vehicle during the first pass;
   receiving, with the computing system, operational data indicative of at least one of a steering angle of a wheel of the agricultural work vehicle, a wheel speed of the wheel of the agricultural work vehicle, or a transmission speed of the agricultural work vehicle during the first pass;
   generating, with the computing system, an as-driven path of the agricultural work vehicle during the first pass based at least in part on the position data, the inertial movement data, and the operational data, wherein generating the as-driven path of the agricultural work vehicle during the first pass based at least in part on the position data, the inertial movement data, and the operational data comprises:
     determining, with the computing system, slip of the agricultural work vehicle during the first pass based at least in part on the inertial movement data and the operational data; and
     generating, with the computing system, the as-driven path of the agricultural work vehicle during the first pass based at least in part on the position data and the slip of the agricultural work vehicle; and
   performing, with the computing system, a control action based at least in part on the as-driven path of the agricultural work vehicle.

2. The method of claim 1, wherein determining the slip of the agricultural work vehicle comprises determining a difference between the inertial movement data and the operational data.

3. The method of claim 2, wherein the operational data is the steering angle of the wheel of the agricultural work vehicle.

4. The method of claim 1, wherein the position data is indicative of the position of the agricultural work vehicle in the field at increments of a particular interval, wherein the as-driven path of the agricultural work vehicle connects directly adjacent ones of the positions of the agricultural work vehicle in the field based at least in part on the inertial movement data and the operational data.

5. The method of claim 1, wherein the control action comprises controlling a subsequent agricultural work vehicle to make a subsequent pass in the field based at least in part on the as-driven path of the agricultural work vehicle during the first pass.

6. The method of claim 1, wherein the control action comprises controlling a user interface to display the as-driven path of the agricultural work vehicle.

7. The method of claim 1, wherein generating the as-driven path of the agricultural work vehicle during the first pass comprises generating the as-driven path of the agricultural work vehicle during the first pass while the first pass is being performed.

8. The method of claim 1, wherein generating the as-driven path of the agricultural work vehicle during the first pass comprises generating the as-driven path of the agricultural work vehicle during the first pass based at least in part on the position data, the inertial movement data, the operational data, and on field parameter data indicative of one or more boundaries of the field.

9. A system for determining an as-driven path of an agricultural work vehicle, the system comprising:
   a positioning device configured to generate position data indicative of a position of the agricultural work vehicle in a field;
   an inertial measurement unit (IMU) supported on the agricultural work vehicle, the IMU being configured to generate inertial movement data of the agricultural work vehicle;
   a non-positional sensor configured to generate operational data indicative of at least one of a steering angle of a wheel of the agricultural work vehicle, a wheel speed of the wheel of the agricultural work vehicle, or a transmission speed of the agricultural work vehicle; and
   a computing system communicatively coupled to the positioning device, the IMU, and the non-positional sensor, the computing system being configured to:
      receive the position data from the position sensor indicative of the position of the agricultural work vehicle in the field during a first pass of the agricultural work vehicle in the field;
      receive the inertial movement data from the IMU during the first pass;
      receive the operational data from the non-positional sensor during the first pass; and
      generate an as-driven path of the agricultural work vehicle during the first pass based at least in part on the position data, the inertial movement data, and the operational data, wherein the computing system is configured to generate the as-driven path of the agricultural work vehicle during the first pass based at least in part on the position data, the inertial movement data, and the operational data by:
         determining slip of the agricultural work vehicle during the first pass based at least in part on the inertial movement data and the operational data; and
         generating the as-driven path of the agricultural work vehicle during the first pass based at least in part on the position data and the slip of the agricultural work vehicle.

10. The system of claim 9, wherein the computing system is configured to determine the slip of the agricultural work vehicle by determining a difference between the inertial movement data and the operational data.

11. The system of claim 10, wherein the operational data is the steering angle of the wheel of the agricultural work vehicle.

12. The system of claim 9, wherein the position data is indicative of the position of the agricultural work vehicle in the field at increments of a particular interval, wherein the as-driven path of the agricultural work vehicle connects directly adjacent ones of the positions of the agricultural work vehicle in the field based at least in part on the inertial movement data and the operational data.

13. The system of claim 9, wherein the computing system is further configured to perform a control action based at least in part on the as-driven path of the agricultural work vehicle.

14. The system of claim 13, wherein the control action comprises controlling a subsequent agricultural work vehicle to make a subsequent pass in the field based at least in part on the as-driven path of the agricultural work vehicle during the first pass.

15. The system of claim 13, wherein the control action comprises controlling a user interface to display the as-driven path of the agricultural work vehicle.

16. The system of claim 9, wherein the computing system is configured to generate the as-driven path of the agricultural work vehicle during the first pass while the first pass is being performed.

17. The system of claim 9, wherein the computing system is further configured to receive field parameter data indicative of one or more boundaries of the field, and wherein the computing system is configured to generate the as-driven path of the agricultural work vehicle during the first pass based at least in part on the position data, the inertial movement data, the operational data, and the field parameter data.

* * * * *